(12) United States Patent
Yasuzaki (10) Patent No.: US 8,641,305 B2
(45) Date of Patent: Feb. 4, 2014

(54) PRINT CONTROL APPARATUS AND METHOD FOR INTERRUPTION-HANDLING OF DUPLEX PRINTING

(75) Inventor: Koji Yasuzaki, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/957,199

(22) Filed: Nov. 30, 2010

(65) Prior Publication Data

US 2011/0211892 A1    Sep. 1, 2011

(30) Foreign Application Priority Data

Feb. 26, 2010    (JP) ................... 2010-041654

(51) Int. Cl.
*B41J 11/44* (2006.01)

(52) U.S. Cl.
USPC ............ 400/76; 400/611; 399/18; 399/19; 399/20; 347/104

(58) Field of Classification Search
CPC ........... B41J 15/00; B41J 15/04; B41J 11/36; B41J 11/42
USPC .............. 400/76, 611; 399/18–20; 347/104
See application file for complete search history.

(56) References Cited

U.S. PATENT DOCUMENTS

| | | | | |
|---|---|---|---|---|
| 4,881,132 A * | 11/1989 | Lajos | .......................... | 358/296 |
| 5,479,856 A * | 1/1996 | Wirz | .......................... | 101/177 |
| 5,868,069 A * | 2/1999 | Khalid et al. | .............. | 101/93.01 |
| 5,970,304 A * | 10/1999 | Stemmle | ........................ | 399/364 |
| 5,987,300 A * | 11/1999 | Mori | .............................. | 399/401 |
| 6,209,454 B1 * | 4/2001 | Christmann et al. | .......... | 101/152 |
| 6,393,252 B1 * | 5/2002 | Yamagishi | ..................... | 399/401 |
| 6,401,608 B1 * | 6/2002 | Lyon et al. | .................... | 101/136 |
| 6,718,872 B2 * | 4/2004 | Kanno | .......................... | 101/118 |
| 6,745,688 B1 * | 6/2004 | Lemelin et al. | ............... | 101/138 |
| 6,786,149 B1 * | 9/2004 | Lomoine et al. | .............. | 101/223 |
| 7,188,564 B2 * | 3/2007 | Ashikagaya | ................... | 101/118 |
| 7,196,809 B2 * | 3/2007 | Ouchi et al. | ................. | 358/1.15 |
| 7,401,914 B2 * | 7/2008 | Yokoi | ........................... | 347/104 |
| 7,599,094 B2 * | 10/2009 | Sellers et al. | ................. | 358/2.1 |
| 7,676,191 B2 * | 3/2010 | Furst | ............................. | 399/401 |

(Continued)

FOREIGN PATENT DOCUMENTS

JP    06-246987 A    9/1994
JP    06-262785 A    9/1994

(Continued)

*Primary Examiner* — Daniel J Colilla
*Assistant Examiner* — Quang X Nguyen
(74) *Attorney, Agent, or Firm* — Canon USA, Inc., IP Division (57) ABSTRACT

A print control apparatus having a decision unit, a print control unit, and a determination unit. The decision unit decides a print order for duplex printing on a continuous sheet. The print control unit causes the print unit to execute a continuous print of first face images on a first face and second face images on a second face after completion of the print on the first face in accordance with the decided print order. In a case where the determination unit determines that an interruption factor occurs before the completion of the print on the first face, the print control unit performs switches to a print on the second face and to cause the print unit to execute a print of any second face image that is predetermined to be arranged on the second face relative to any first face image already printed on the first face.

20 Claims, 4 Drawing Sheets

(56) References Cited

U.S. PATENT DOCUMENTS

| | | | |
|---|---|---|---|
| 7,725,071 B2 * | 5/2010 | Izuchi et al. | 399/401 |
| 7,882,781 B2 * | 2/2011 | Takahashi | 101/116 |
| 2001/0020973 A1 * | 9/2001 | Akada et al. | 347/213 |
| 2002/0005888 A1 * | 1/2002 | Obata et al. | 347/139 |
| 2002/0191162 A1 * | 12/2002 | Morita | 355/27 |
| 2003/0112285 A1 * | 6/2003 | Han | 347/14 |
| 2004/0246325 A1 * | 12/2004 | Sekiya | 347/104 |
| 2005/0046658 A1 * | 3/2005 | Kojima | 347/19 |
| 2005/0076798 A1 * | 4/2005 | Sato et al. | 101/116 |
| 2005/0163550 A1 * | 7/2005 | Gobbak et al. | 400/76 |
| 2005/0280685 A1 * | 12/2005 | Yokoi | 347/104 |
| 2006/0107855 A1 * | 5/2006 | Hatayama | 101/228 |
| 2006/0203306 A1 * | 9/2006 | Hoshi | 358/497 |
| 2006/0283343 A1 * | 12/2006 | Koyama et al. | 101/119 |
| 2007/0122225 A1 * | 5/2007 | Izuchi et al. | 400/624 |
| 2008/0159800 A1 * | 7/2008 | Wada | 400/621 |
| 2008/0178754 A1 * | 7/2008 | Ohdaira et al. | 101/118 |
| 2008/0199235 A1 * | 8/2008 | Shoji et al. | 399/364 |
| 2009/0060610 A1 * | 3/2009 | Matsuhashi | 399/395 |
| 2009/0237687 A1 * | 9/2009 | Takata | 358/1.9 |
| 2009/0244177 A1 * | 10/2009 | Tatsumi | 347/37 |
| 2010/0085591 A1 * | 4/2010 | Arai | 358/1.13 |
| 2010/0310268 A1 * | 12/2010 | Obata | 399/85 |
| 2010/0321434 A1 * | 12/2010 | Baba | 347/12 |
| 2011/0002721 A1 * | 1/2011 | Yamazaki | 399/364 |
| 2011/0043586 A1 * | 2/2011 | Silverbrook et al. | 347/104 |
| 2011/0211009 A1 * | 9/2011 | Fujinaga | 347/16 |
| 2011/0211857 A1 * | 9/2011 | Mikami | 399/82 |
| 2011/0211888 A1 * | 9/2011 | Fujinaga | 399/403 |
| 2011/0211892 A1 * | 9/2011 | Yasuzaki | 400/76 |
| 2011/0211893 A1 * | 9/2011 | Shishido et al. | 400/76 |
| 2011/0236107 A1 * | 9/2011 | Sugiura | 400/76 |
| 2011/0298860 A1 * | 12/2011 | Yoshida | 347/16 |
| 2012/0050378 A1 * | 3/2012 | Kido | 347/19 |

FOREIGN PATENT DOCUMENTS

| | | | | | |
|---|---|---|---|---|---|
| JP | 06262785 A | * | 9/1994 | | B41J 2/325 |
| JP | 11-249346 A | | 9/1999 | | |
| JP | 11249346 A | * | 9/1999 | | |
| JP | 2000-261595 A | | 9/2000 | | |
| JP | 2003-149931 A | | 5/2003 | | |
| JP | 2004-066761 A | | 3/2004 | | |
| JP | 2004-167932 A | | 6/2004 | | |
| JP | 2004-209808 A | | 7/2004 | | |
| JP | 2005-067757 A | | 3/2005 | | |
| JP | 2005067757 A | * | 3/2005 | | B65H 43/04 |
| JP | 2006-209513 A | | 8/2006 | | |
| JP | 2007-124040 A | | 5/2007 | | |
| JP | 2007-183894 A | | 7/2007 | | |
| JP | 2008-108124 A | | 5/2008 | | |
| JP | 2008-126530 A | | 6/2008 | | |
| JP | 2008-173937 A | | 7/2008 | | |
| JP | 2009066815 A | * | 4/2009 | | |
| JP | 2009-154540 A | | 7/2009 | | |
| WO | WO 2009133659 A1 | * | 11/2009 | | B41J 3/60 |

* cited by examiner

FRONT FACE PRINT ORDER →

| | | | | | | | |
|---|---|---|---|---|---|---|---|
| FRONT FACE PRINT IMAGE | PAGE 1 | PAGE 3 | PAGE 5 | PAGE 7 | PAGE 9 | PAGE 11 | PAGE 13 |
| BACK FACE PRINT IMAGE | PAGE 2 | PAGE 4 | PAGE 6 | PAGE 8 | PAGE 10 | PAGE 12 | PAGE 14 |

← BACK FACE PRINT ORDER

FIG. 3B

FRONT FACE PRINT ORDER →

| | | | | | | | | |
|---|---|---|---|---|---|---|---|---|
| FRONT FACE PRINT IMAGE | PAGE 1 | PAGE 3 | PAGE 5 | | PAGE 7 | PAGE 9 | PAGE 11 | PAGE 13 |
| BACK FACE PRINT IMAGE | PAGE 2 | PAGE 4 | PAGE 6 | | PAGE 8 | PAGE 10 | PAGE 12 | PAGE 14 |

INTERRUPTED POSITION     ← BACK FACE PRINT ORDER

FIG. 3C

FRONT FACE PRINT ORDER →

| | | | | | | | | |
|---|---|---|---|---|---|---|---|---|
| FRONT FACE PRINT IMAGE | PAGE 6 | PAGE 4 | PAGE 2 | | PAGE 14 | PAGE 12 | PAGE 10 | PAGE 8 |
| BACK FACE PRINT IMAGE | PAGE 5 | PAGE 3 | PAGE 1 | | PAGE 13 | PAGE 11 | PAGE 9 | PAGE 7 |

INTERRUPTED POSITION     ← BACK FACE PRINT ORDER

FIG. 4

PRINT CONTROL APPARATUS AND METHOD FOR INTERRUPTION-HANDLING OF DUPLEX PRINTING

BACKGROUND OF THE INVENTION

1. Field of the Invention

The present invention relates to a print control apparatus and method for performing a print by using a continuous sheet.

2. Description of the Related Art

In a typical print apparatus where images are printed on both sides of a continuous sheet such as roll paper, a print is performed on one side of the continuous sheet introduced into a print unit and the continuous sheet is cut and temporarily wound up. The continuous sheet is introduced into the print unit again to perform a print on the other side (see Japanese Patent Laid-Open No. 11-249346). To perform an efficient print in such a print apparatus, a print is performed in such an order that the print on one side is continuously performed for a plurality of pages, and once the print on the one side for all the pages is ended, the print on the other side is performed.

In a case where the print is performed in such an order, a page order is decided so that a print order becomes the above-described order. However, when an interruption factor occurs such as running out of paper while the print on one side is being performed, the print is ended at the time point, and the print on the one side for the remaining pages and the print on the other side for all the pages are not performed. In this way, in a case where the print is ended in mid-course, it is necessary to start the print again from the beginning, which is inefficient.

SUMMARY OF THE INVENTION

An embodiment provides a print control apparatus to cause a print unit to execute a print on a first face and a second face as a print on both sides of a continuous sheet. The print control apparatus includes a decision unit, a print control unit, and a determination unit. The decision unit decides a print order when the print unit is caused to execute the print on both sides of the continuous sheet in accordance with an arrangement of first face images printed on the first face and an arrangement of second face images printed on the second face that is opposite to the first face. The print control unit causes the print unit to execute a continuous print of those first face images that are predetermined to be arranged on the first face and to cause the print unit to execute a continuous print of those second face images that are predetermined to be arranged on the second face after completion of the print on the first face in accordance with the print order decided by the decision unit. The determination unit determines whether an interruption factor occurs with respect to the print executed by the print unit. In a case where the determination unit determines that the interruption factor occurs before the completion of the print on the first face, the print control unit performs a control to switch to a print on the second face and to cause the print unit to execute a print of any second face image that is predetermined to be arranged on the second face relative to any first face image already printed on the first face.

Further features will become apparent from the following description of exemplary embodiments with reference to the attached drawings.

DESCRIPTION OF THE EMBODIMENTS

Hereinafter, embodiments will be described with reference to the drawings. It is noted that relative arrangements of respective components of an apparatus used in this embodiment, an apparatus shape, and the like are only for purposes of illustration and not limitation.

Figure 1:
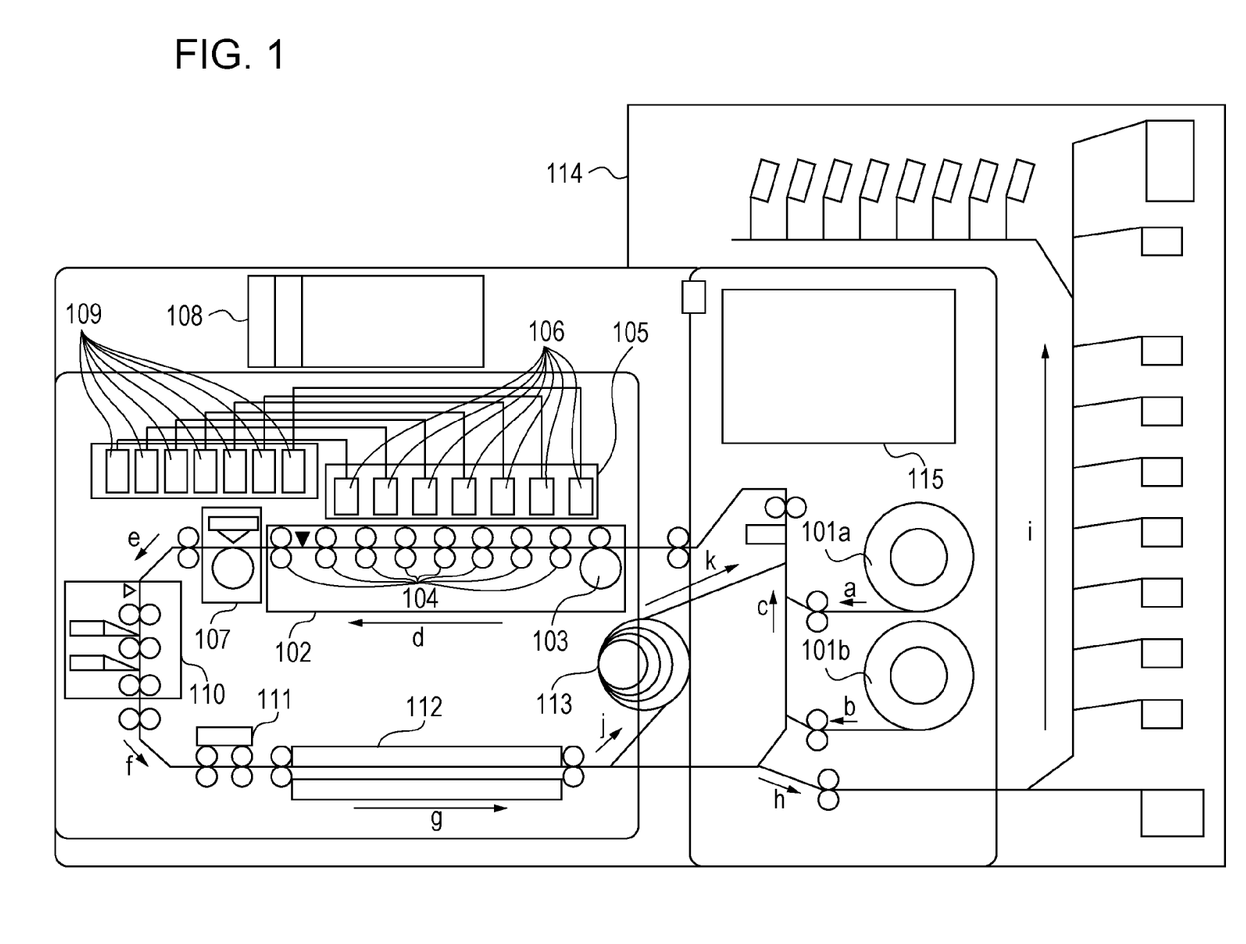
FIG. 1 illustrates a configuration of an image forming apparatus according to an embodiment.

FIG. 1 illustrates a schematic configuration of an image forming apparatus which is an example of a print control apparatus according to the present embodiment. The image forming apparatus of FIG. 1 having a print function of printing data received from an external apparatus only is illustrated, but the embodiment is not limited to this. An apparatus functioning as a copier which is further provided with a reading apparatus for reading an image on an original or a multifunctional apparatus added with other functions may also be applied.

Also, an example will be described in which a roll sheet is used as a recording material (recorded medium or recording sheet) on which a print processing is performed. This roll sheet is an example of a continuous sheet, but for the continuous sheet, a sheet other than the sheet wound into a roll may also be used. Also, a cut of the continuous sheet may be automatically performed by the image forming apparatus or may be cut while a user issues a manual instruction. A material of the recording material is not limited to paper, and various materials can be used as long as a print processing can be performed. Also, the image forming apparatus is not only designed to perform a print on the continuous sheet. An image forming apparatus capable of also performing a print on a cut sheet obtained by previously cutting a sheet into a predetermined size may be applied.

Also, a print system is not limited to a print of an image based on an inkjet system using liquid ink for image printing which will be described below. For a recording agent applied to the recording material, solid ink may be used, and various systems such as an electrophotography system using toner, a sublimation system, a thermal transfer system, and a dot impact system can be adopted. Also, the image forming apparatus is not only designed to perform a color recording using recording agents of a plurality of colors. A monochrome recording only based on black (including gray) may be performed. Also, the print is not limited to a print of a visible image and may be a print of invisible image or an image that is hard to be visually recognized. Also, other than general images, the print may be a print of various images such as, for example, a wiring pattern, a physical pattern in parts manufacturing, and a base sequence of DNA. In other words, the embodiment can be applied to recording apparatuses of various types as long as the recording agent can be applied on the recording material.

Also, in a case where the operation of the print processing in the image forming apparatus is performed on the basis of the instruction from the external apparatus connected to the image forming apparatus of FIG. 1, this external apparatus functions as the print control apparatus.

FIG. 1 is a cross-sectional view of an outline of an entire configuration of the image forming apparatus using a roll sheet (continuous sheet having a size longer than a length of a print unit (one page) in a conveying direction) as the recording material. The image forming apparatus includes the following components 101 to 115, and these components are arranged in a single housing. It is however noted that a configuration may also be adopted that these components are separately arranged in a plurality of housings.

A control unit 108 has a built-in control unit provided with a controller (including a central processing unit (CPU) or a microprocessor unit (MPU)), an output device for user interface information (generator for display information, sound information, or the like), and various input/output (I/O) interfaces and is configured to govern various controls on the entire image forming apparatus.

The image forming apparatus is provided with two sheet cassettes including an upper stage sheet cassette 101a and a lower stage sheet cassette 101b as a unit arranged to hold and supply the roll sheet. A user puts the roll sheet (hereinafter, which will be referred to as sheet) in a magazine and then loads the magazine into the image forming apparatus main body. The sheet pulled out from the upper stage sheet cassette 101a is conveyed in an "a" direction in the drawing, and the sheet pulled out from the lower stage sheet cassette 101b is conveyed in a "b" direction in the drawing. The sheets from either cassette travel in a "c" direction and reach a conveyance unit 102. The conveyance unit 102 conveys the sheet via a plurality of rotating rollers 104 in a "d" direction (horizontal direction) during the print processing. When the sheet cassette at a supply source is switched from one to the other, the already pulled-out sheet is rewound into the cassette, and from the cassette in which a sheet to be newly supplied is set, the sheet is newly supplied.

On an upper side of the conveyance unit 102, a head unit 105 is arranged so as to face the conveyance unit 102. In the head unit 105, independent print heads 106 for a plurality of colors (seven colors according to the present embodiment) are held along the conveying direction. In the present example, seven print heads corresponding to the seven colors including C (cyan), M (magenta), Y (yellow), LC (light cyan), LM (light magenta), G (gray), and K (black) are provided. Of course, print heads for colors other than these may also be used, and it is not necessary to use all the print heads for the seven colors.

The present image forming apparatus forms an image on the sheet by ejecting the ink from the print heads 106 in synchronism with the conveyance of the sheet by the conveyance unit 102. It is noted that the print heads 106 are arranged at positions where ejection destinations of the ink are not overlapped with the rotating rollers 104. Instead of directly ejecting the ink onto the sheet, the ink may be used for forming the image by applying the ink onto an intermediate transfer member and then applying the ink onto the sheet.

The unit for the print according to the present embodiment is composed by including the conveyance unit 102, the head unit 105, and the print heads 106 described above.

Ink tanks 109 independently store the ink of the respective colors. From the ink tanks 109, the ink is supplied to sub tanks provided so as to correspond to the respective colors by tubes, and from the sub tanks to the respective print heads 106, the ink is supplied via the tubes.

For the print heads 106, along the conveying direction at the time of the print, that is, the "d" direction, line heads of the respective colors (seven colors according to the present embodiment) are disposed. The line heads of the respective colors may be formed by a seamless single nozzle chip or formed by disposing divided nozzle chips in line or regularly like a zigzag alignment. According to the present embodiment, a so-called full multi head is adopted in which the nozzles are disposed in a range covering a width of a print area of the sheet at the maximum size that can be used by the present apparatus. The inkjet system for ejecting the ink from the nozzles can adopt a system using a heater element, a system using a piezo-electric element, a system using an electrostatic element, a system using an MEMS element, and the like. The ink is ejected from the nozzles of the respective heads on the basis of print data, but a timing for the ejection is decided by an output signal of a conveyance encoder 103.

After the image is formed on the sheet, the sheet is conveyed from the conveyance unit 102 to a scanner unit 107. The scanner unit 107 optically reads the printed image or special pattern on the sheet to perform a check whether the printed image has a problem, a check on a state of the present apparatus including an ejection state of the ink, and the like. For the check method for the printed image, the ejection state of the ink may be checked by reading a pattern for checking the state of the head or by checking a success or failure of the print through a comparison with the original image. The check method can be appropriately selected from various methods.

The sheet is conveyed from the vicinity of the scanner unit 107 in an "e" direction and introduced into the cutter unit 110. A cutter unit 110 cuts the sheet for a predetermined print unit length each. This predetermined print unit length varies in accordance with a size of the image to be printed. For example, in an L-print photo size, the length of the conveying direction is 135 mm, and an A4 size, the length of the conveying direction is 297 mm. In the case of a simplex print, the cutter unit 110 cuts the sheet in page unit, but depending on a content of a print job, the cutter unit 110 may not cut the sheet in page unit in some cases. Also, in the case of a duplex print, the cutter unit 110 does not cut on a first face of the sheet (face on which the print is performed first: for example, front face) in page unit and then cuts on a second face (face on which the print is performed afterwards: for example, back face) in page unit in a case where the images are continuously printed for a predetermined length. It is noted that the cutter unit 110 is not limited to a cutter unit for cutting the sheet for each image on one piece at the time of the simplex print or the back face print of the duplex print. The cut is not performed until the sheet is conveyed for a predetermined length, and after the sheet is conveyed for the predetermined length, the sheet is cut, and a cut and separation for each image on one sheet (one page) may also be performed by another cutter apparatus through a manual operation or the like. Also, with regard to a width direction of the sheet, in a case where a cut is necessary, the sheet is cut by using another cutter apparatus.

The sheet conveyed from the cutter unit 110 is conveyed in an "f" direction in the drawing in the unit and conveyed into a back face printing unit 111. In a case where the image is printed only on one side of the sheet, the back face printing unit 111 is a unit arranged to print predetermined information on the back face of the sheet. The information printed on the back face of the sheet includes information such as a character, a symbol, or a code corresponding to each printed image (for example, order management number or the like). In a case where the print heads 106 prints the images for the print job of the duplex print, the back face printing unit 111 prints the above-described information in an area other than the area in which the print heads 106 prints the images. The back face printing unit 111 can adopt systems such as impress of the recording agent, thermal transfer, and the inkjet.

The sheet passing through the back face printing unit 111 is conveyed to a drying unit 112 next. The drying unit 112 is a unit arranged to heat the sheet passing through in a "g" direction in the drawing in the unit by warm wind (heated gaseous matter (air)) to dry the sheet on which the ink is applied in a short period of time. It is noted that for the drying method, instead of using the warm wind, various methods can also be adopted such as use of cool wind, warming by a heater, natural drying only based on stand-by, and irradiation of radio waves such as ultraviolet radiation. The sheets cut at the print unit length pass through within the drying unit 112 one sheet each and conveyed in an "h" direction in the drawing to a sorting unit 114.

The sorting unit 114 holds a plurality of trays (18 trays according to the present embodiment) and sorts out a trays at a discharge destination of the sheet in accordance with the print unit length or the like. The respective trays are allocated with tray numbers. In the sorting unit 114, the sheet passing through within the unit in an "i" direction in the drawing is discharged into a tray corresponding to a tray number set for each printed image while it is checked on a free space in the tray or whether the sheets are fully loaded by sensors provided on the respective trays. With regard to the tray serving as the discharge destination of the cut sheet, a particular tray is specified by an issuing source of the print job (host apparatus) in some cases, and a tray with a free space is arbitrarily specified on the image forming apparatus side in some cases. The sheets can be discharged up to a previously decided number into one tray. In the case of the print job exceeding this previously decided number of sheets, the sheets are discharged into a plurality of trays. The number, size, type, and the like of sheets that can be discharged to the tray vary depending on a size (type) or the like of the tray. In FIG. 1, in a group of trays disposed vertically (up and down) (hereinafter, which will be referred to as large trays), both sheets having a large size (larger than the L-print size such as the A4 size) and a small size (L-print size) can be discharged. Also, in a group of trays disposed horizontally (left and right) (hereinafter, which will be referred to as small trays), the discharge of the sheets having the small size (L-print size) can be carried out but the discharge of the sheets having the large size cannot be carried out. Then, the number of output sheets that can be discharged is larger in the large trays than the small trays.

Also, a state in which the sheet is being discharged, the discharge is completed, or the like can be identified by the user by using a display device (for example, using an LED or the like). For example, a plurality of LEDs that emit light in different mutually different colors are provided in the respective trays, and depending on a color, a lighting state, a flashing state, and the like of the lighting LED, the user can be notified of various states of the respective trays.

Also, each of the plurality of trays can be assigned with a priority sequence, and when the print job is executed, the image forming apparatus allocates the trays with the free space (where the sheet does not exist) as the sheet discharge destination while following an order of the priority sequences. By default, for the large trays, the tray on the upper side has a higher priority sequence, and for the small trays, the tray on the further left side has a higher priority sequence. Also, the priority sequences of the small trays are higher than the priority sequences of the large trays. With regard to this priority sequence, the priority sequence of the tray at a location where the user can easily take out the sheets may be previously higher. Also, the priority sequence may be appropriately changed by an operation of the user or the like.

A sheet winding-up unit 113 winds up the sheet which is not cut for each page and on which the print is performed on the front face. At the time of the duplex print, first, the sheet on which the image formation is performed on the front face is not cut by the cutter unit 110 in page unit and the sheet is cut after the continuous print on the front face is ended. The sheet on which the print is performed on the front face passes through within the unit in a "j" direction in the drawing and wound up by the sheet winding-up unit 113. Then, after the image formation on the front face for a series of pages is ended, the wound-up sheet is conveyed in a "k" direction in the drawing in the unit again while a face opposite to the last front face is set as a printable face, in other words, the face facing the print heads 106 is reversed. With the above-described conveyance, the print of the image is performed on the back face which is opposite to the last front face. In the case of the normal simplex print, the sheet on which the image is printed is conveyed to the sorting unit 114 without the winding-up by the sheet winding-up unit 113.

In this manner, at the time of the duplex print, the winding-up of the sheet is performed by using the sheet winding-up unit 113, and the sheet is reversed to perform the print on the back face. Thus, the faces of the sheet vary at the time of the discharge into the sorting unit 114 at the time of the simplex print and at the time of the duplex print. That is, in the case of the simplex print, the reverse of the sheet using the sheet winding-up unit 113 is not performed, and the sheet on which the image on the first page is printed is therefore discharged in a state in which the image on the first page is facing down. Then, in the case of a job where one print job exists for a plurality of pages, from the sheet on the first page, the sheet is discharged into the tray. After that, the sheets are sequentially discharged on subsequent pages, and the sheets are stacked up. The above-described discharge is referred to as face-down discharge. On the other hand, in the case of the duplex print, the reverse of the sheet using the sheet winding-up unit 113 is performed, and the sheet on which the image on the first page is printed is therefore discharged in a state in which the image on the first page is facing up. Then, in the case of a job where one print job is for outputting a plurality of sheets, from the sheet including the last page, the sheet is discharged. After that, the sheets on smaller-numbered pages are sequentially discharged, and the sheets are stacked up. Finally, the sheet on which the image on the first page is printed is discharged. The above-described discharge is referred to as face-up discharge.

An operation unit 115 is a unit for performing various operations by the user and notifying the user of various pieces of information. For example, it is possible to check a print status for each order such as in which tray specified by the user the sheet on which the image is printed is stacked or whether the image is being printed or the print is ended. Also, the user can operation/check the operation unit for a check on various states of the apparatus such as the remaining amount of ink and the remaining number of sheets and an instruction of an execution of an apparatus maintenance such as a head cleaning.

Figure 2:
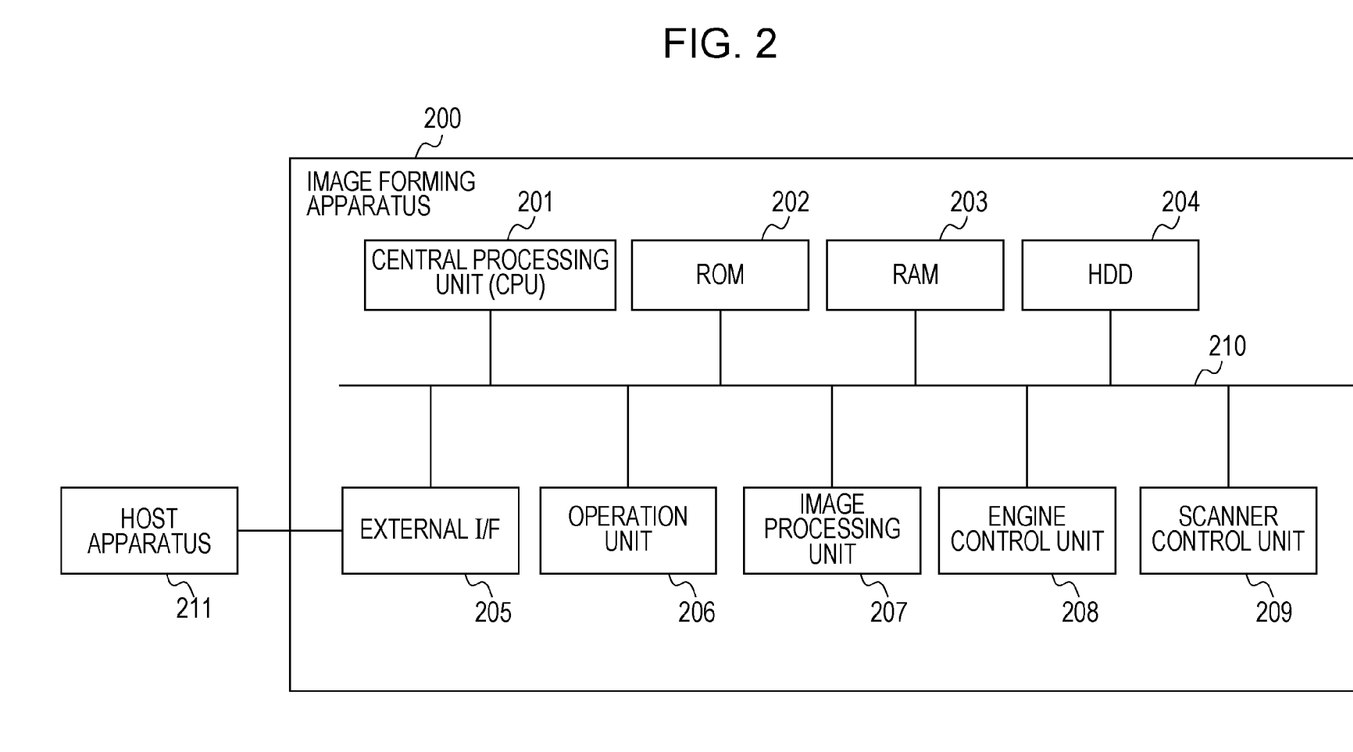
FIG. 2 is a block diagram illustrating a configuration related to a control on the image forming apparatus of FIG. 1.

FIG. 2 is a block diagram for describing a configuration related to a control in the image forming apparatus illustrated in FIG. 1. An image forming apparatus 200 is the image forming apparatus illustrated in FIG. 1. It is however noted that the following configuration is an example, and various modifications can be realized.

A central processing unit (CPU) 201, a read only memory (ROM) 202, a random access memory (RAM) 203, an image processing unit 207, an engine control unit 208, and a scanner control unit 209 are mainly included in the control unit 108. Then, a hard disk drive (HDD) 204, an operation unit 206, an external interface (I/F) 205, and the like are connected to the control unit 108 via a system bus 210.

The CPU 201 is a central processing unit having a mode of a micro processor (micro computer) and is included in the control unit 108 of FIG. 1. The CPU 201 controls an operation of the entire image forming apparatus 200 on the basis of an execution of a program or an activation of hardware. The ROM 202 stores the program executed by the CPU 201 and fixed data necessary for various operations of the image forming apparatus 200. The RAM 203 is used as a work area for the CPU 201 and as a temporary storage area for various pieces of reception data and stores various pieces of setting data. The HDD 204 can store the program executed by the CPU 201, the print data, and setting information necessary for the various operations of the image forming apparatus 200 in a built-in hard disk or read out the data. It is noted that instead of the HDD 204, another large capacity storage apparatus may also be adopted.

The operation unit 206 includes a hard key and a touch panel for the user to perform various operations and a display unit for presenting (notifying) the user of various pieces of information and corresponds to the operation unit 115 of FIG. 1. Also, the presentation of the information to the user can also be performed by outputting a sound (buzzer, voice, or the like) on the basis of sound information from a sound generator.

The image processing unit 207 performs an image processing or a rendering (conversion) into image data (bitmap image) of the print data (for example, data represented in page description language) dealt with by the image forming apparatus 200. A color space (for example, YCbCr) of the image data included in the input print data is converted into a standard RGB color space (for example, sRGB). Also, various image processings including a resolution conversion into effective number of pixels (at which the image forming apparatus 200 can perform the print processing), an image analysis, an image correction, and the like are applied as needed on the image data. The image data obtained through these image processings is stored in the RAM 203 or the HDD 204.

The engine control unit 208 performs a control on a processing of printing the image based on the print data on the sheet in accordance of a control command received from the CPU 201 or the like. An ink ejection instruction to the print heads 106 of the respective colors, an ejection timing setting for adjusting dot positions (ink impact positions) on the recording medium, an adjustment based on an obtainment of a head drive state, or the like, are performed. In accordance with the print data, a drive control on the print head is performed, the ink is ejected from the print head, and the image is formed on the sheet. Also, a drive instruction of a pulling-out roller for pulling out the sheet, a drive instruction of a conveyance roller for conveying the pulled-out sheet, an obtainment of a rotation situation of the conveyance roller, and the like are performed, so that a control on the conveyance roller is performed, and the sheet is conveyed at an appropriate speed in an appropriate path and stopped.

The scanner control unit 209 controls an image sensor in accordance with a control command received from the CPU 201 or the like to read the image on the sheet and obtains analog luminance data or red (R), green (G), and blue (B) to be converted into digital data. For the image sensor, a CCD image sensor, a CMOS image sensor, or the like can be adopted. Also, the image sensor may be a linear image sensor or an area image sensor. Also, the scanner control unit 209 obtains a situation of the image sensor on the basis of a drive instruction and the drive of the image sensor, analyzes luminance data obtained from the image sensor, and performs detections of non-ejection of the ink from the print heads 106, cut positions of sheet, and the like. The sheet in which it is determined that the image is correctly printed by the scanner control unit 209 is subjected to a drying processing for the ink on the sheet and then discharged into the specified tray of the sorting unit.

A host apparatus 211 is an apparatus which corresponds to the above-described external apparatus, is connected to an external part of the present image forming apparatus 200, and functions as a supply source of the image data for the image forming apparatus 200 to perform the print and issues orders of various print jobs.

The host apparatus 211 may be realized by a general-use personal computer (PC) or a data supply apparatus of another type. The data supply apparatus of the other type includes an image capturing apparatus for capturing an image and generate image data. The image capturing apparatus is a reader (scanner) for reading an image on an original and generating image data, a film scanner for reading a negative film or a positive film and generating image data, or the like. Also, other examples of the image capturing apparatus include a digital camera for picking up a still image and generating digital image data and a digital video camera for picking up a movie and generating moving image data. In addition, such a configuration may be adopted that a photo storage is installed on the network, or the image forming apparatus may have a socket to which a detachably attachable portable memory is inserted is provided. Thus, an image file stored in the photo storage or the portable memory is read out to be generated into the image data for the print. Also, various data supply apparatuses may be adopted such as a dedicated-use terminal for the present image forming apparatus instead of the general-use PC. Each of these data supply apparatuses may be a component of the image forming apparatus or another apparatus connected to the external part of the image forming apparatus. Also, in a case where the host apparatus 211 is composed of a PC, in a storage apparatus of the PC, an OS, application software for generating the image data, and a printer driver for the image forming apparatus 200 are installed. The printer driver controls the present image forming apparatus 200 or converts the image data supplied from the application software into a format that can be dealt with by the image forming apparatus 200 to generate the print data. Also, the conversion from the print data to the image data may be performed on the host apparatus 211 side and then the data may be supplied to the image forming apparatus 200. It is noted that it is not necessary to realize all the above-described processings by using software, and a part or all of the processings may be realized by using hardware. The image data supplied from the host apparatus 211, other commands, and further, status signals, and the like can be transmitted and received via the external I/F 205 with the image forming apparatus 200. The external I/F 205 may be a local I/F or a network I/F. Also, the external I/F 205 may have a wired connection or wireless connection.

The above-described respective components in the image forming apparatus 200 are connected via the system bus 210 and can be mutually communicated.

It is noted that in the above-described example, one CPU 201 controls all the components in the image forming apparatus 200 illustrated in FIG. 2, but a configuration other than this may also be adopted. That is, some of the respective functional blocks are separately provided with CPUs, and the respective CPUs may perform an individual control. Also, the respective functional blocks can adopt various modes in which functional blocks are appropriately divided into the individual processing unit and control unit on the basis a manner of the burden share other than the configuration illustrated in FIG. 2, and some of the functional blocks are integrated. Also, for the reading of the data from the memory, a DMAC (Direct Memory Access Controller) can be used.

Figure 3A:
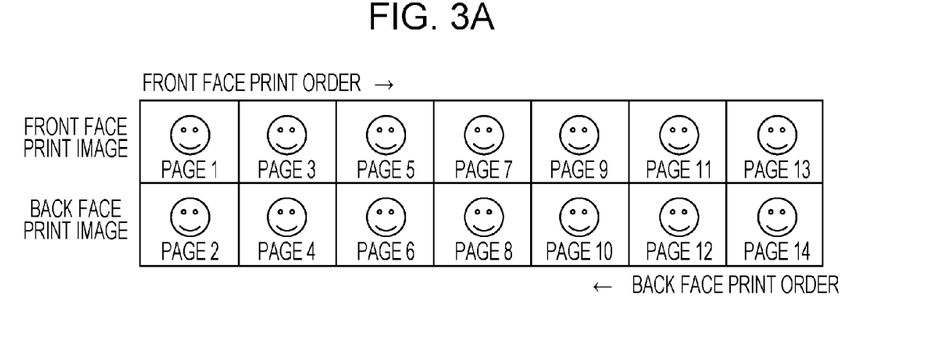
FIGS. 3A to 3C illustrate arrangements of images in a case where a print is performed on both sides of a continuous sheet.
Figure 3B:
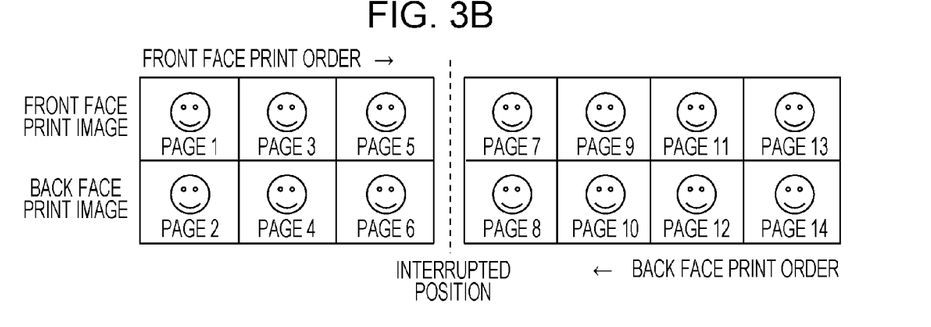
Figure 3C:
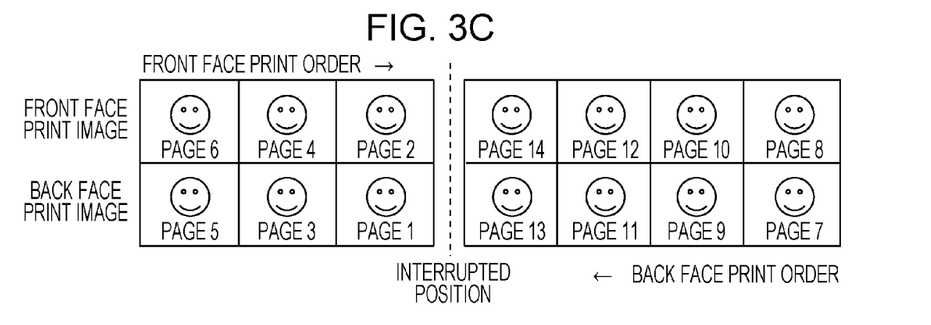

FIGS. 3A to 3C are explanatory diagrams for describing a print order in a case where the print is performed on both faces of the roll sheet by the image forming apparatus 200. FIGS. 3A to 3C illustrate the images on the respective pages arranged without gaps, but margins may be provided between the respective pages. That is, hereinafter, the continuous print of a plurality of images includes a print providing a margin between an image and another image and refers to a continued print in which the sheet is not cut in mid-course. Also, in FIGS. 3A to 3C, the image on one page is arranged on the respective faces of the one sheet discharged into the tray, but the images on a plurality of pages may be arranged on the same face.

First, the print data for 14 pages are input from the host apparatus 211 in an order of page numbers 1, 2, 3, ..., 13, and 14 together with a duplex print specification information to the image forming apparatus 200 via the external I/F 205. Herein, as illustrated in FIG. 3A, while following the page order, the printed images are arranged alternately on the front face (first face) and the back face (second face=opposite face) (odd-numbered pages on the front face, and even-numbered pages on the back face). It is noted that the arrangement of the respective pages varies depending on a content of the instructed print. That is, in a case where a bookbinding print is instructed, for example, the last page (herein, page 14) is arranged on the back face on page 1, which is a different arrangement from that of FIG. 3A. Herein, an example will be described in a case where the print is instructed in the arrangement illustrated in FIG. 3A.

Typically, in a case where the duplex print using the cut sheet is performed, while following the input page order, the print is performed in the order of 1 (front), 2 (back), 3 (front), ..., 13 (front), and 14 (back). However, as the present image forming apparatus 200 uses the roll sheet, after the print on the front face, it is necessary to cut the sheet. Then, after the sheet is wound up, the sheet is reversed, and then the print on the back face is performed. For that reason, it takes much time to perform the print if one sheet is completed for the front face and the back face each time. Thus, in a case where the present image forming apparatus 200 performs the print on both sides of the roll sheet, the print is all performed on the front face on a series of pages, and then the sheet winding-up and cut are performed. Then, the remaining print on the back face is continuously performed on the reversed sheet. Then, each time the print on the back face is performed for one page, the continuous sheet is cut for one sheet piece. According to this, it is not necessary to reserve the sheet each time the print on one face is performed for one page, and the print time can be shortened. That is, when the present image forming apparatus 200 accepts a print job, while following a content of the job, in order to execute the job efficiently, a scheduling on the order of the images to be printed on the respective faces of the sheet is carried out.

A general flow of the sequence from the input of the print data to the print processing when the print is performed on both sides of the roll sheet will be described.

First, the CPU 201 temporarily stores the print data input in the above-described page order in the HDD 204. Then, herein, as the duplex print for the arrangement illustrated in FIG. 3A is instructed, the CPU 201 decides a print order as 1 (front), 3 (front), ..., 13 (front), 14 (back), 12 (back), ..., and 2 (back) (the front face is for the ascending order, and the back face is for the descending order). This print order is different in the arrangement order from the order in which the print data is input (page order). Next, the CPU 201 supplies the print data of the respective pages to the image processing unit 207 while following the above-described decided print order. The image processing unit 207 performs a conversion into a format in which the print processing on the print data on the front face can be performed (rendering processing into the image data) and stores this image data in the HDD 204. Then, the generated image data is supplied to the engine control unit 208 in the above-described page order. At this time, the engine control unit 208 is notified of the image data for printing on which face of the sheet, the page number, and the information with which the print job can be identified together with the image data.

The engine control unit 208 receiving this image data supplies the sheet from a sheet cassette 101a or 101b that holds sheets in accordance with the size of the image to be printed. Then, the engine control unit 208 causes the conveyance unit 102 to convey the sheet to a print position by the head unit 105 for sequentially performing the print of the image based on the image data on the front face of the sheet to convey the sheet to a reading position by the scanner unit 107. It is checked whether the image is correctly printed on the basis of a content of the image data obtained by reading the printed image by the scanner unit 107, and the sheet is conveyed to the cutter unit 110. At this time, in a case where it is checked that the image is correctly printed, without the cutting by the cutter unit 110 in page unit, the sheet passes with the drying unit 112 to be subjected to the ink drying processing while keeping a state the sheet on which the pages are printed onto the front face is not cut, and the winding-up is performed by the sheet winding-up unit 113. On the other hand, in a case where it is checked that the image is not correctly printed, the CPU 201 causes the cutter unit 110 to cut the sheet so that the page where the image is not correctly printed is to be discharged. Then, this cut sheet is discharged into a tray for rejected items among the respective trays of the sorting unit 114 (for example, a tray located at a lowermost part). Then, in order to perform the print again for the sheet where the print is not correctly performed, the CPU 201 supplies the engine control unit 208 with the image data again to repeatedly perform the subsequent processings described above.

As described above, when it is checked that the images on the respective pages where the print on the front face is instructed are correctly printed, the CPU 201 causes the cutter unit 110 as needed to cut the sheet where the print on the front face is already performed and subsequently performs the print processing on the back face. At this time, the print data on the front face still remains in the HDD 204. While following the print order decided in the above-described manner, the CPU 201 supplies the print data of the respective pages on the back face to the image processing unit 207. The image processing unit 207 converts the print data on the back face in a format in which the print processing can be performed (rendering processing into the image data) and stores the obtained image data in the HDD 204. At this time, depending on a content of the print instruction, the image data may be rotated by 180 degrees in some cases. Then, the generated image data is supplied to the engine control unit 208 the above-described page order. Herein also, as in the front face, the engine control unit 208 is notified of the image data for printing on which face of the sheet, the page number, and the information with which the print job can be identified together with the image data.

The engine control unit 208 conveys the sheet where the images are already printed on the front face which is wound up by the sheet winding-up unit 113 to the conveyance unit 102 again, and the print is started sequentially from the last page on the back face. It is noted that when the print is performed on the back face of the sheet, the conveyance is started from the side cut by the cutter unit 110 from the sheet winding-up unit 113, and the back face is set to face the head unit 105 side. When the sheet is conveyed to the print position by the head unit 105, the engine control unit 208 sequentially prints the images on the page where the print instruction for the back face exists on the back face of the images on the corresponding front face. Then, as in the front face, it is checked whether the print is correctly performed by the scanner unit 107, and also the sheet is cut by the cutter unit 110 in page unit. Then, if it is checked that the print is correctly performed, the cut sheet passes through the drying unit 112 and is subjected to the ink drying processing. Then, the sheet is sequentially conveyed to the sorting unit 114 and discharged into the specified tray. At this time, from the last sheet (in FIG. 3A, the sheet where page 13 and page 14 are printed), the sheets are discharged into the tray. Thus, in face-up (state in which the images on the front face are facing upward), sequentially, the sheets where the smaller-numbered pages are arranged are discharged. With this configuration, the sheets are stacked up in the correct order, and it is therefore not necessary for the user to perform the rearrangement. It is noted that in the small tray located in an upper part of the sorting unit 114, the sheets are stacked while being standing up, but still the sheets are discharged sequentially so that the page numbers become smaller, and the sheets are stacked in the correct order. Then, herein, up to the permissible number of sheets for the tray, all the sheets are discharged into the same tray. This is because the printed products based on one print job (order) are discharged into the same tray as much as possible. It is however noted that the printed products based on the job exceeding the permissible number of sheets for the tray are discharged into another tray. On the other hand, on the basis of the scanner unit 107, in a case where it is checked that the images on the back face is not correctly printed, the cut sheet is discharged into the tray for rejected items. Then, the image on the front face of the opposite face held in the HDD 204 and the images on the back face are printed again. Herein, a detail of the processing for the reprint for the images on both faces will be omitted.

As described above, a plurality of images that should be arranged on the first face are continuously printed, and after the completion of the print of all the images expected at one time on the first face, the print of the images on the second face is continuously performed that should be arranged on the opposite face to the images already printed on the first face. With this configuration, the series of printed produces where the instructed duplex print is performed are completed.

The above-described procedure is for a case in which the sufficient sheets and ink exist for printing the images on both faces on the series of pages in a unit where the print is performed at one time (the printing is not interrupted during the series of pages are printed). In this manner, in a case where the print on the first face is continuously performed first and the print on the opposite face is continuously performed next, it is sometimes necessary to interrupt the printing because of an error or the like. The interruption factors includes, for example, occurrence of an interrupt print due to another print job, shortage of sheets, jam of the sheet, and shortage of the ink. Hereinafter, a print procedure in such a case will be described.

FIG. 3B illustrates a print order in a case where the interruption occurs before the print for a series of expected pages on the front face is interrupted because of some interruption factor (for example, the factor described above). Herein also, an example will be described in a case where the print instruction itself instructs to performs the arrangement illustrated in FIG. 3A. Then, it is assumed that the print is correctly performed up to page 5 (front) (the third sheet in sheet unit to be cut), and the interruption factor occurs.

When the interruption factor occurs, the engine control unit 208 notifies the CPU 201 of an interruption position (the print has been performed up to which page, the print has not been performed from which page, or the like). The CPU 201 receiving this notification changes the print order and executes the print of the images on the opposite face so as not to wave the part where the images on the front face are already correctly printed.

When the interruption factor occurs, the CPU 201 causes the cutter unit 110 to cut the sheet to separate the part up to the page where the print is correctly performed from the subsequent part. It is however noted that in a case where the interruption factor is the sheet shortage, the cut of the sheet at this point may not be performed in some cases. Then, the winding-up of the sheet by the sheet winding-up unit 113 is completed to stand by. After this, in a case where the standing-by sheet print job is not resumed and an instruction for cancelling is issued, the CPU 201 causes the wound-up sheet to be directly discharged into the tray for rejected products.

When the interruption factor is removed and the resumption of the print is instructed (or the removal of the interruption factor is detected), first, the CPU 201 changes the print order of 1 (front), 3 (front), . . . , 13 (front), 14 (back), 12 (back), . . . , and 2 (back) decided in the above in the following manner. That is, the already printed pages are skipped to change (reschedule) the print order into 6 (back), 4 (back), 2 (back), 7 (front), 9 (front), 11 (front), 13 (front), 14 (back), 12 (back), 10 (back), and 8 (back).

It is noted that the interruption factor may be the ink shortage in some cases. Herein, even in the case of the interruption due to the ink shortage, the print order is changed in the above-described manner, but after the short supply ink is filled, the print may also be resumed directly without changing the print order. Also, in the case of the sheet jam, various recovery processings are performed, but a description thereof will be omitted herein. Also, in the case of the interrupt print, the sheet for the previous print job stands by in a state of being wound up by the sheet winding-up unit 113, and thus, only the interrupt based on the simplex print is permitted. The print products based on the interrupt print are discharged into a tray different from the tray for the print products based on the print job described herein.

When the print order is changed as described above, the CPU 201 causes the engine control unit 208 to instruct the conveyance unit 102 to convey the sheet where the images are already printed on the front face which is wound up by the sheet winding-up unit 113 again for executing the print on the back face while following the newly decided print order. Other than the point where the print order is changed, the processing is performed similarly as in the example of FIG. 3A, and when the print on the back face (up to page 2) and the cut for each page is ended, the sheets are discharged into the tray of the sorting unit 114.

Then, the CPU 201 performs the print for page 7 and subsequent pages and causes the engine control unit 208 to prepare for the image data and also newly start the sheet conveyance. The new sheet is supplied from the cassette different from the previously used cassette among the sheet cassette 101a or 101b or supplied from the same cassette (in some cases, after a roll sheet is newly set). Then, the print after the interruption position in FIG. 3B is executed in a similar procedure to the example of FIG. 3A. It is however noted that with regard to the sheet discharge herein, the sheets after the interruption position are discharged into a tray from the tray for the previous three sheets (where the images on pages 1 to 6 are printed) among the plurality of trays of the sorting unit 114. In other words, although these are the printed products based on one print job (order), the sheets before and after the interruption are discharged into mutually different trays. This is because, as described above, in the present image forming apparatus 200, as the sheets are discharged in the order from the sheet for the large-numbered page to the sheets for the smaller-number pages, after the first sheet, the fourth sheet is discharged, the order is varied, and a situation is avoided in which the rearrangement by the user becomes bothersome. Therefore, herein, even before exceeding the maximum number of sheets that can be discharged for the tray at the discharge destination prior to the interruption, the sheets after the interruption are discharged into a different tray. In this case, such a setting is preferably adopted that the tray for discharging the sheets after the interruption is set as a tray closer to the tray for discharging the sheets before the interruption as much as possible for facilitating the operation by the user. Also, at this time, the LEDs provided to the plurality of trays in which the printed products based on one print job are discharged emit light in a same color. According to this, the user can easily recognize that the printed products respectively discharged into the plurality of trays are based on one print job. It is noted that other than the configuration in which the LEDs provided to the respective trays emit the light in the same color, through another method (for example, display to the operation unit 206), the user may be notified that the outputs based on one print job are discharged into a plurality of trays.

As described above, during the printing of the series of pages (during the printing of the series of pages on the front face), even in a case where the interruption factor occurs, the sheets on which the images are printed on the front face are not wasted, the print is switched to the print on the back face, and it is possible to print the images on the opposite face corresponding to the already printed images. Then, the remaining print can be appropriately continued. Furthermore, the sheets where the images are printed on the first face (where the images are printed also on the second face) which are cut before the interruption factor occurs and the sheets where the images are printed on the first face and the second face which are cut after the interruption factor occurs are discharged into different discharge destinations, so that those sheets are not mixed. That is, as the sheet groups having mutually different arrangement order are stacked and discharged into the same discharge destination, it is possible to prevent the trouble for the user to perform the rearrangement through the manual operation.

Also, in a case where the interruption factor occurs as described above, the occurrence of the interruption factor due to the sheet shortage can be previously predicted (before the execution of the print job) in some cases. Hereinafter, the processing in that case will be described.

First, the amount (length) of sheet used in the series of print jobs is determined. This determination is performed on the basis of the size of the image specified in the print job, whether the duplex print is specified, the number of pages for the print, and the like. Also, the remaining amount of the roll sheet set in the sheet cassette 101a or 101b is determined. The remaining amount of the roll sheet can be estimated while the total amount of the sheet length when the roll sheet is newly set in the sheet cassette is stored in the RAM 203 and the conveyance encoder 103 sequentially stores the conveyance amount of sheet in the RAM 203. That is, the current remaining amount can be estimated while the sheet amount conveyed so far is subtracted from the total amount of the sheet length of the set sheet. Also, instead of this, the remaining amount may be estimated on the basis of a diameter (or radius) of the roll sheet or the diameter (or radius) of the roll sheet and a type of the sheet. By comparing the amount of sheet used in the print job determined in the above-described manner with the remaining number of sheets that should be used, it is possible to determine whether the sheet shortage occurs during the printing of the print job to be carried out after this and whether the print can be performed up to which page. On the basis of this determination result, the print order is decided.

Herein, it is assumed that from the above, as illustrated in FIG. 3C, the CPU 201 determines that the interruption occurs because of the sheet shortage when the print is performed for the third sheet. In the example of FIG. 3B, the sheets are discharged into different trays before and after the interruption, and herein, the print order is decided so that the sheet(s) after the interruption is (are) not discharged into the different tray on the ground that the interruption occurs. That is, as illustrated in FIG. 3C, the print order is decided as 6 (front), 4 (front), 2 (front), 1 (back), 3 (back), 5 (back), 14 (front), 12 (front), 10 (front), 8 (front), 7 (back), 9 (back), 11 (back), and 13 (back). This means that the arrangement of the front and back in FIG. 3C is inverse to these in FIGS. 3A and 3B. The processing procedure for the print is similar to those described in FIGS. 3A and 3B, and a description thereof will be omitted herein. In this state, when the procedure similar to those in FIGS. 3A and 3B is performed, the first page is facing downward (face-down), and subsequently, the sheets including the following pages are stacked up. Therefore, before the duplex print is started, when it is determined that the interruption factor occurs and such a print order is set in advance, it is possible to discharge the sheets without changing the trays before and after the interruption while the user does not need to perform the rearrangement. With this configuration, the burden on the user can be alleviated. It is however noted that in a case where the sheets exceed the number of sheets that can be discharged into one tray, the sheets are discharged into a different tray, but in this case too, the tray is preferably closer to the previous tray as much as possible.

It is noted that in this case, as the arrangement of the front and back is inverse to those in FIGS. 3A and 3B, surface process states and the like of the front face and the back face of the sheet are preferably the same or the user preferably permits that the arrangement of the front and back is inversed. The sheet process state for printing the images on the front face may not be distinguished from the sheet process state for printing the images on the back face.

Also, in the above description, at the time of the duplex print, in the normal state, it is assumed that the face-up discharge is performed, but on the other hand, in the normal state, the face-down discharge may be performed. In this case, the print order and the page arrangement order in FIGS. 3A and 3B are inversed. That is, in the case of FIG. 3A, the print order is set as 14 (back), 12 (back), . . . , 4 (back), 2 (back), 1 (front), 3 (front), . . . , 11 (front), and 13 (front). In the case of FIG. 3B, the print order is set as 14 (back), 12 (back), 10 (back), <interruption occurrence>, 9 (front), 11 (front), 13 (front), <tray change>, 8 (back), 6 (back), 4 (back), 2 (back), 1 (front), 3 (front), 5 (front), and 7 (front). In the following too, in a case where the outputs of the duplex print are discharged in the face-down state, the setting for the print page order and the print face may be inversed.

Figure 4:
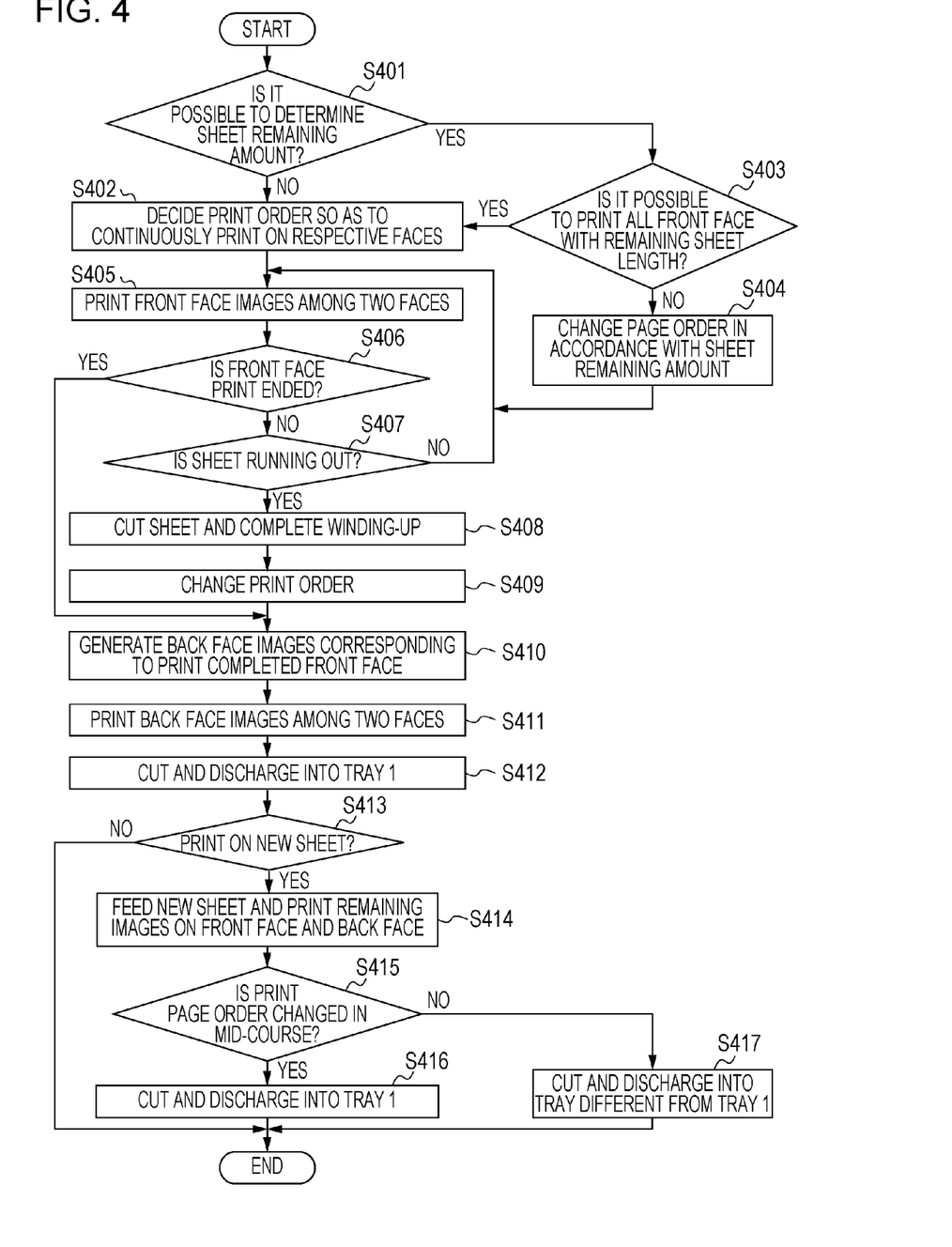
FIG. 4 is a flow chart of a processing flow in a case where the print is performed on both sides of the continuous sheet.

In the light of the above description, a flow of the processing performed while the CPU 201 loads the control program stored the ROM 202 or the HDD 204 into the RAM 203 and executes the control program will be described. FIG. 4 is a flow chart illustrating the flow of this processing. This flow chart starts when the image forming apparatus 200 accepts a new print job. It is assumed that the accepted print job is composed of instruction information for instructing the print on both faces in the arrangement illustrated in FIG. 3A and print data of a print target received from the host apparatus 211. It is however noted that in the case of the duplex print in the arrangement different from that in FIG. 3A, only the page arrangement is different, and a condition is similar in which the print on the first face is continuously performed, and thereafter, the print on the opposite face is continuously performed. Also, in a case where the total page number is an odd number, a case where the print on one face is performs only partially, or the like, a face with no printed image exists. Also, an example will be described in a case where the interruption factor is the sheet shortage, but the processing is carried out in a similar procedure also in the case of other interruption factors as described above.

First, in S401, it is determined that the remaining sheet used in the accepted print job can be determined. In a case where the remaining sheet can be determined, the flow progresses to S403, and in a case where the remaining sheet cannot be determined, the flow progresses to S402. It is noted that in the beginning, in a case where the image forming apparatus 200 is not provided with the function of determining the remaining sheet or a case where the decision on the print order while taking into account the remaining sheet is not performed, the flow progresses to S402 without performing the determination in S401.

In S402, the print order is decided in such a manner that as in FIG. 3A, all the odd-numbered pages are arranged on the front face in an ascending order of the page numbers, and also, all the even-numbered pages are arranged on the back face in a descending order so that the print is continuously performed on the respective faces of the sheet.

In S403, it is determined whether the print for all the pages on the front face for the print job of this time can be performed with the remaining sheet. In a case where the print for all the pages can be performed, the flow progresses to S402 from step S403 when the print for all pages can be performed, and in a case where the print for all the pages cannot be performed, the flow progresses to S404.

In S404, as illustrated in FIG. 3C, for the images before the interruption, a change is made so that the images on the even-numbered pages are arranged on the front face and the images on the odd-numbered pages are arranged on the back face in a descending order. Also, for the images after the interruption, a change is made as illustrated in FIG. 3C.

In S405, the print of the images on the front face is performed which is decided to perform the print first among the print data for both faces. In the step of this print, the cutting of the sheet in page unit is not performed. Then, until it is determined in S406 that the print for all the pages on the front face that should be continuously performed in the previously decided print order or it is determined in S407 that the sheet runs out, the print for the pages on the front face is sequentially performed. As the print performed herein is the print job for the duplex print, the sheet where the print is performed on the front face is sequentially wound up by the sheet winding-up unit 113.

In S406, in a case where it is determined that the print for all the pages on the front face is ended, the flow progresses to S410, and in a case where it is determined that the print is not ended, the flow progresses to S407. It is noted that in S406, in a case where it is determined that the print for all the pages on the front face is ended, for the print on the back face, the sheet cutting by the cutter unit 110 and the winding-up by the sheet winding-up unit 113 are carried out as described above.

In S407, in a case where it is determined that the sheet runs out before the print for all the pages on the front face is ended, the flow progresses to S408, and as described by using FIGS. 3B and 3C, the sheet is cut by the cutter unit 110, and the winding-up by the sheet winding-up unit 113 is completed. It is however noted that the cutting herein may not be performed in some cases depending on the location where the sheet runs out.

Then, in S409, as described by using FIG. 3B, the print order is changed. It is however noted that in a case where the flow progresses from S404 to S409, the print order after the interruption is already decided, and this processing is skipped.

In S410, the image data for the print on the back face corresponding to the front face where the print is completed is generated by the image processing unit 207. Subsequently, in S411, while following the generated image data, as described above, the print of the images on the back face is sequentially performed. In S412, the sheet cutting in page unit is performed by the cutter unit 110, and the sheet is discharged into one of the trays of the sorting unit 114. In FIG. 4, the tray is set as Tray 1, but the tray is not set as a fixed tray. If the print job specifies, the specified tray is selected, and if the print job does not specify, one of available trays is selected.

Next, in S413, it is determined whether it is necessary to perform the print on a new sheet. In other words, herein, the affirmative determination is made in a case where the print for all the pages is not ended and the interruption occurs as in FIGS. 3B and 3C. In a case where the affirmative determination is made, the flow progresses to S414. When the negative determination is made, in other words, when the print is all ended, the processing for the print job is ended here.

In S414, the sheet is newly supplied from the sheet cassette 101a or 101b, and the remaining print of the images on the front face and the back face is executed. That is, the print after the interruption position in FIGS. 3B and 3C is executed in the above-described manner.

Then, in S415, it is determined whether the print order of the print executed in S414 is changed in S409. If the print order is changed in S409, this is the case of the example of FIG. 3C, and the sheet(s) is (are) discharged into the same tray as the tray where the sheet(s) is (are) discharged in S412 (up to the permissible number of sheets for the tray). On the other hand, in a case where the print order is not changed in S409, this is the case of the example of FIG. 3B, and the sheet(s) is (are) discharged into the a different tray from the tray where the sheet(s) is (are) discharged in S412 in order to alleviate the burden on the user from the rearrangement as described above.

As described above, according to the present embodiment, when the duplex print is performed by using the continuous sheet, in a case where after the images arranged on the first face are continuously printed, the images on the opposite side are printed, even when the print is interrupted before the print of the continuous number of sheet expected on the first face is ended, it is possible to appropriately deal with the situation.

That is, as in the example of FIG. 3B, by changing the expected print order during the printing of the print job is performed because of the occurrence of the interruption factor, without wasting the sheet where the print on the first face is performed, it is possible to execute the print on the opposite side. Also, at this time, as the discharge destinations are varied before and after the interruption, the sheets for the print job having different orders are not mixed, and it is possible to alleviate the trouble for the user to perform the rearrangement. Also, according to the above-described embodiment, the mixture of the sheets is prevented by varying the trays at the discharge destination, but the configuration is not limited to this. The mixture of the sheets before and after the interruption can be prevented through various methods, for example, by discharging the sheets before the interruption and the sheets after the interruption while being respectively shifted in the same tray and by providing a partitioning sheet at a boundary before and after the interruption. In either case, any method may be used as long as the discharged sheet(s) before the interruption can be distinguished from the discharged sheet(s) after the interruption.

Also, as in the example of FIG. 3C, as the interruption is previously predicted to occur, and the print order is decided on the basis of the prediction, without wasting the sheet where the images are printed before the interruption, the print job can be completed. Furthermore, at this time, it is possible to discharge the sheets for the print job in an appropriate order without changing the tray before and after the interruption, and the trouble for the user to take out the sheets can be alleviated.

Also, in the above description, the sheet cutting by the cutter unit 110 is performed in job unit, page unit, or the like, the configuration is not limited to this. That is, the image forming apparatus 200 is not provided with the cutter unit 110, the images on the first face are printed until the set sheet runs out in the sheet cassette, and after the sheet is used up until the end, the print on the opposite face may be performed. At this time, the user cuts the sheet by using a separately provided cutting apparatus. Also, it is not necessary to continue the print on the first face until the sheet runs out. Before the sheet runs out, by the user, cutting of the sheet is performed using a cutting device, the face of the sheet is changed, and the sheet is set again, and then the print on the second face may be performed by the image forming apparatus 200.

It is noted that in the above description, a processing such as scheduling of the print order or the like other than the part for performing the print is realized by an external apparatus such as a host apparatus or an external controller, and while following that, the image forming apparatus may be caused to execute the print. At that time, the external apparatus obtains a status (information on occurrence of the above-described interruption factor or the like) from the image forming apparatus to decide the print order or the arrangement of the images. In this case, this external apparatus functions as the print control apparatus.

Also, the embodiments are also realized by executing the following processing. That is, the processing is executed in which software (program) for realizing the above-described function of the embodiment is supplied to a system or an apparatus via a network or various storage medium, and a computer (a CPU, an MPU, or the like) of the system or the apparatus reads out and executes the program. Also, the program may be executed by a single computer or a plurality of computers operatively associated with each other. Also, all of the above-described processings are not necessarily realized by the software, and a part or all of the processings may be realized by hardware. In an example, a computer-readable medium or a computer-readable storage medium may store a program that causes a print control apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041654 filed Feb. 26, 2010, which is hereby incorporated by reference herein in its entirety.

What is claimed is:

1. A print control apparatus to cause a print unit to execute a print on both faces of a continuous sheet, the print control apparatus comprising:
a decision unit configured to decide, in response to the print control apparatus receiving instructions to execute the print on both faces of the continuous sheet, a first print order specifying an arrangement of first face images to be printed on a first face of the continuous sheet and an arrangement of second face images to be printed on a second face of the continuous sheet that is opposite to the first face;
a print control unit configured to cause the print unit to execute a continuous print of images that are predetermined to be arranged on the first face of the continuous sheet and to cause the print unit to execute a continuous print of images that are predetermined to be arranged on the second face of the continuous sheet after completion of the print on the first face in accordance with the print order decided by the decision unit; and
a determination unit configured to determine whether an interruption factor occurs during the print executed by the print unit,
wherein, after an image already is printed on the first face and in a case where the determination unit determines that the interruption factor occurs before the completion of the print on the first face, the print control unit changes the first print order decided by the decision unit to a second print order and performs a control to switch to a print on the second face and to cause the print unit to execute, according to the second print order, a print of each second face image that is predetermined to be arranged on the second face relative to a first face image already printed on the first face before the completion of the print on the first face, and
wherein at least one of the decision unit and the determination unit are implemented by at least one processing unit in the print control apparatus.

2. The print control apparatus according to claim 1, wherein the continuous sheet is a first continuous sheet and, after the print of each second face image that is predetermined to be arranged on the second face relative to a first face image already printed on the first face is completed, the print control unit causes the print unit to execute a print, on a first face of a second continuous sheet, of any remaining first face images that were predetermined to be arranged on the first face of the first continuous sheet and to execute, after the print of any remaining first face images on the first face of the second continuous sheet is completed, a print on a second face of the second continuous sheet.

3. The print control apparatus according to claim 2, further comprising a cutting control unit configured to control a cutting unit to cut a continuous sheet,
wherein the cutting control unit causes the cutting unit to cut the first continuous sheet and the second continuous sheet into a plurality of cut sheets, and
wherein the print control unit causes a discharging unit to discharge the cut first continuous sheet and the cut second continuous sheet so that the cut first continuous sheet and the cut second continuous sheet are distinguishable from each other.

4. The print control apparatus according to claim 3, further comprising a notification unit configured to notify that the cut first continuous sheet and the cut second continuous sheet are discharged to different discharge destinations.

5. The print control apparatus according to claim 2, further comprising:
a cutting control unit configured to control a cutting unit to cut a continuous sheet; and
a second determination unit configured to determine whether an interruption factor of the print on both faces of the first continuous sheet occurs before the print on both faces of the first continuous sheet is started,
wherein the decision unit decides the first print order in a manner that the arrangement of the first face images to be printed on the first continuous sheet before the interruption factor occurs is used as the arrangement of the first face images to be printed on the second continuous sheet after the interruption factor occurs.

6. The print control apparatus according to claim 3, wherein the print control unit causes the discharging unit to discharge the cut first continuous sheet and the cut second continuous sheet so that the first continuous sheet and the second continuous sheet are distinguishable from each other by varying trays at the discharge destination, by discharging the cut sheets before the interruption and the cut sheets after the interruption while being respectively shifted in a same tray, or by providing a partitioning sheet at a boundary before and after the interruption.

7. The print control apparatus according to claim 2, further comprising a cutting control unit configured to control a cutting unit to cut a continuous sheet,
wherein, in a case where the determination unit determines that the interruption factor occurs or the print unit completes printing images on the first face of the first continuous sheet, the cutting control unit causes the cutting unit to cut the continuous sheet.

8. The print control apparatus according to claim 7, further comprising a reversing control unit configured to control a reversing unit to reverse the continuous sheet,
wherein, in a case where the interruption factor occurs or the print unit completes printing images on the first face of the first continuous sheet, the cutting control unit causes the cutting unit to cut the continuous sheet and the reversing control unit causes the reversing unit to reverse the continuous sheet.

9. The print control apparatus according to claim 1, wherein the interruption factor determined by the determination unit includes at least one of running-out of the continuous sheet, jamming of the continuous sheet, shortage of a recording agent used by the print unit for the print, and an interrupt print.

10. The print control apparatus according to claim 1, wherein the continuous sheet has a size longer than a length of a unit of printing in a conveying direction.

11. The print control apparatus according to claim 10, wherein the continuous sheet is a roll sheet.

12. The print control apparatus according to claim 1, wherein the print control apparatus includes predetermined print unit length information at which the continuous sheet is configured to be cut into a plurality of page units to separate the continuous sheet into a plurality of cut sheets.

13. The print control apparatus according to claim 12, further comprising an external interface unit configured to transmit information out of the print control apparatus.

14. The print control apparatus according to claim 1, wherein the continuous sheet is configured to be cut into a plurality of page units at predetermined print unit lengths, and wherein each page unit is configured to include one of a face image and no printed image.

15. The print control apparatus according to claim 1, wherein the print unit executes the print of each second face image that is predetermined to be arranged on the second face relative to a first face image already printed on the first face without first completing the print of any other first face image on the first face such that the continuous sheet on which the first face images are printed on is not wasted.

16. The print control apparatus according to claim 1, wherein the print control unit changes the first print order decided by the decision unit to a second print order during the continuous print of images on a face by the print unit such that the print order is changed after a first face image already is printed on the first face and before the completion of the continuous print of the first face images on the first face.

17. The print control apparatus according to claim 1, wherein, in response to the interruption factor occurring during the continuous print of images on a face by the print unit, the print control unit causes the print unit to interrupt the printing and cease the printing in a middle of the continuous print of images on the face.

18. The print control apparatus according to claim 1, further comprising a cutting control unit configured to control a cutting unit to form, in response to the determination unit determining that the interruption factor occurs before the completion of the continuous print of the first face images on the first face, a cut continuous sheet having first face images already printed on the first face by cutting the continuous sheet before the completion of the continuous print of the first face images on the first face,
wherein the print control unit causes a print of images on the second face of the cut continuous sheet that are relative to images in the first face images already printed on the first face.

19. A print control method for a print control apparatus to cause a print unit to execute a print on both faces of a continuous sheet, the print control method comprising:
deciding, in response to the print control apparatus receiving instructions to execute the print on both faces of the continuous sheet, a first print order specifying an arrangement of first face images to be printed on a first face of the continuous sheet and an arrangement of second face images to be printed on a second face of the continuous sheet that is opposite to the first face;
causing the print unit to execute a continuous print of images that are predetermined to be arranged on the first face of the continuous sheet and causing the print unit to execute a continuous print of images that are predetermined to be arranged on the second face of the continuous sheet after completion of the print on the first face in accordance with the decided print order; and
determining whether an interruption factor occurs during the print executed by the print unit,
wherein, after an image already is printed on the first face and in a case where it is determined that the interruption factor occurs before the completion of the print on the first face, the first print order decided in the deciding is changed to a second print order and a control to switch to a print on the second face and to cause the print unit to execute, according to the second print order, a print of each second face image that is predetermined to be arranged on the second face relative to a first face image already printed on the first face is performed before the completion of the print on the first face.

20. A non-transitory computer-readable medium storing a program that causes a print control apparatus to perform the print control method according to claim 19.

* * * * *